US005513971A

United States Patent [19]
Nakamura et al.

[11] Patent Number: 5,513,971
[45] Date of Patent: May 7, 1996

[54] HYDRAULIC CONTROL CIRCUIT FOR AN INJECTION MOLDING MACHINE

[75] Inventors: Nobuyuki Nakamura; Toshiyasu Koda; Tsuyoshi Arai, all of Nagano, Japan

[73] Assignee: Nissei Plastic Industrial Co., Ltd., Nagano, Japan

[21] Appl. No.: 281,749

[22] Filed: Jul. 28, 1994

[30] Foreign Application Priority Data

Aug. 6, 1993 [JP] Japan .................. 5-215052

[51] Int. Cl.$^6$ ............................ B29C 45/77
[52] U.S. Cl. ............... 425/145; 264/40.7; 425/146
[58] Field of Search ....................... 425/145, 146; 264/40.7

[56] References Cited

U.S. PATENT DOCUMENTS 4,712,991 12/1987 Hehl .......................... 425/145
4,802,267 2/1989 Hosoya .......................... 425/145

FOREIGN PATENT DOCUMENTS 5-50483 3/1993 Japan.

*Primary Examiner*—Tim Heitbrink

[57] ABSTRACT

An hydraulic control circuit for an injection molding machine feedback-controls the operations of an injection cylinder by connecting an hydraulic source and an oil tank to a hydraulic actuator through a plurality of servo valves. The plurality of servo valves, such as four-port servo valves, are connected in parallel and a servo valve control function unit is used which controls the servo valves preferentially to the feedback control to permit series or parallel control of the servo valves. Thus, even when the specifications of an injection molding machine require a larger size and higher speed, the size of the injection molding machine is prevented from increasing, the cost is decreased, the response speed and the stability are remarkably improved, and fine control is realized over a wide control range.

22 Claims, 3 Drawing Sheets

HYDRAULIC CONTROL CIRCUIT FOR AN INJECTION MOLDING MACHINE

FIELD OF THE INVENTION

The present invention relates to a hydraulic control circuit for an injection molding machine, equipped with a feedback control system using a servo valve for a hydraulic circuit.

DESCRIPTION OF RELEVANT ART

A hydraulic control circuit for an injection molding machine using a servo valve for a hydraulic circuit is already disclosed in the official gazette of Japanese Patent Laid-Open No. 5(1993)-50483.

This type of the hydraulic control circuit generally comprises a feedback control system. FIG. 4 shows an existing hydraulic control circuit including a servo valve and a feedback system. In FIG. 4, Mo represents an injection molding machine. The injection molding machine Mo comprises an injection apparatus 60 and a clamping apparatus 70. The injection apparatus 60 comprises a barrel cylinder 61 having an injection nozzle 62 at its front end and a hopper 63 at its rear end. A screw 64 is inserted into the barrel cylinder 61 and a screw drive unit 65 is connected to the rear end of the cylinder 61. The screw drive unit 65 comprises an injection cylinder (hydraulic actuator) 67 containing a double-rod piston 66. A front rod 66f of the piston 66 connects with the rear end of the screw 64 and a rear rod 66r connects with a shaft of an oil motor 68 set at the rear end of the injection cylinder 67 through a spline. A clamping apparatus 70 shown by virtual lines supports a mold 71 to open/close the mold 71.

The injection cylinder 67 connects with an hydraulic control circuit F. The hydraulic control circuit F comprises a hydraulic circuit 80 and a control circuit 90. The hydraulic circuit 80 comprises a four-port servo valve 81. The port A of the servo valve 81 connects with a front oil chamber 67f of the injection cylinder 67, the port B of the valve 81 connects with a rear oil chamber 67r of the cylinder 67, the port P of the valve 81 connects with an hydraulic source (hydraulic pump and accumulator) 82, and the port T of the valve 81 connects with an oil tank 83. The control circuit 90 comprises a pressure sensor 91 for detecting the pressure of the front oil chamber 67f of the injection cylinder 67, a pressure sensor 92 for detecting the pressure of the rear oil chamber 67r of the injection cylinder 67, a comparator 93 for obtaining the difference between pressures of the pressure sensors 91 and 92, and a deviation detector 94 for obtaining the deviation of the detected pressure Pd outputted by the comparator 93 from the preset pressure Ps. The control circuit 90 further comprises a pressure compensation unit 95 for obtaining the pressure control input Pc compensating the deviation obtained from the deviation detector 94, a velocity detection unit 96 for detecting the position of the screw 64 to obtain the detected velocity Vd, a deviation detector 97 for obtaining the deviation of the detected velocity Vd from the preset velocity Vs, a velocity compensation unit 98 for obtaining the velocity control input Vc compensating the deviation obtained from the deviation detector 97, switch function units 99 and 100 for selecting the pressure control input Pc and the velocity control input Vc, and a servo command unit 101 for converting the pressure control input Pc or velocity control input Vc into the command signal Sc for controlling the servo valve 81. The command signal Sc outputted by the servo command unit 101 is inputted to a command signal input unit of the servo valve 81. Symbol 102 represents a control function unit for turning on/off the switch function units 99 and 100.

The above constitution makes it possible to obtain the deviation of the detected velocity Vd from the preset velocity Vs from the deviation detector 97 and also obtain the compensated velocity control input Vc from the velocity compensation unit 98 while velocity is controlled. In this case, the switch function unit 100 is turned on and the switch function unit 99 is turned off by the control function unit 102. Therefore, the velocity control input Vc is inputted to the servo command unit 101 and the command signal Sc for controlling the servo valve 81 is outputted from the servo command unit 101. Then, the command signal Sc is inputted to the servo valve 81, a flow rate is controlled by the servo valve 81, pressured oil whose flow rate is controlled is supplied to the rear oil chamber 67r of the injection cylinder 67, and the screw 64 progresses. The actually detected velocity Vd is obtained from the velocity detection unit 96. Thereby, the command signal Sc changes and feedback control is performed so that the progress velocity of the screw 64 becomes equal to the preset velocity Vs.

However, the existing hydraulic control circuit F described above selects the servo valve 81 to be used by computing a flow rate necessary for a control object and selecting a servo valve having the performance most suitable for the control of the object in accordance with a computed result. Therefore, when the specification of an injection molding machine requires larger size and higher speed, larger flow rate (larger capacity) and higher response speed are required for the servo valve 81 in accordance with the increase of the size and speed of the machine. Thus, problems occur because of the extreme size and the cost of the servo valve 81 and the degraded response speed. Moreover, because the control range is limited to the control range of a single servo valve, problems occur because fine control cannot be achieved over a wide range and stability is degraded.

SUMMARY OF THE INVENTION

It is an object of the present invention to provide a hydraulic control circuit for an injection molding machine for keeping a servo valve small in size and realizing a low cost even when the specification of the injection molding machine requires larger size and higher speed.

It is another object of the present invention to provide a hydraulic control circuit for an injection molding machine with a remarkable response speed and remarkable stability for realizing fine control over a large control range.

To achieve the above objects, the present invention is constituted by connecting the hydraulic source 4 and oil tank 5 to a hydraulic actuator such as the injection cylinder 2 through a servo valve and connecting a plurality of servo valves (such as four-port servo valves 3x and 3y) in parallel and using the servo valve control function unit 6 for controlling the servo valves 3x and 3y preferentially to feedback control in order to constitute the hydraulic control circuit 1 for an injection molding machine for feedback-controlling the operation of the injection cylinder 2 by a servo valve. In this case, the servo valves 3x and 3y are controlled by using the servo valve 3x for the feedback control of the injection cylinder 2 and keeping the servo valve 3y fully close or fully open. Moreover, the servo valves 3x and 3y are simultaneously used for the feedback control of the injection cylinder 2.

Thereby, the operation of the injection cylinder 2 is feedback-controlled by the four-port servo valves 3x and 3y connected in parallel with the hydraulic source 4, oil tank 5, and injection cylinder 2. The servo valves 3x and 3y are controlled by the servo valve control function unit 6 preferentially to the feedback control.

Therefore, it is possible to operate the servo valves 3x and 3y in series by keeping the servo valve 3y fully closed and using only the servo valve 3x for the feedback control of the injection cylinder 2 and also keeping the servo valve 3x fully open and using only the servo valve 3y for the feedback control of the injection cylinder 2. Moreover, it is possible to operate the servo valves 3x and 3y in parallel by simultaneously using the servo valves 3x and 3y for the feedback control of the injection cylinder 2.

Thus, even if the specification of an injection molding machine requires larger size or higher speed, the size of a servo valve is prevented from increasing, the cost is decreased, and the response speed and the stability are remarkably improved by operating the servo valves 3x and 3y in parallel. Moreover, the control range is expanded and fine control is realized by operating the servo valves 3x and 3y in series.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The preferred embodiments of the present invention are described below by referring to the accompanying drawings.

First, the constitution of the hydraulic control circuit 1 for an injection molding machine is described below by referring to FIG. 1.

Figure 1:
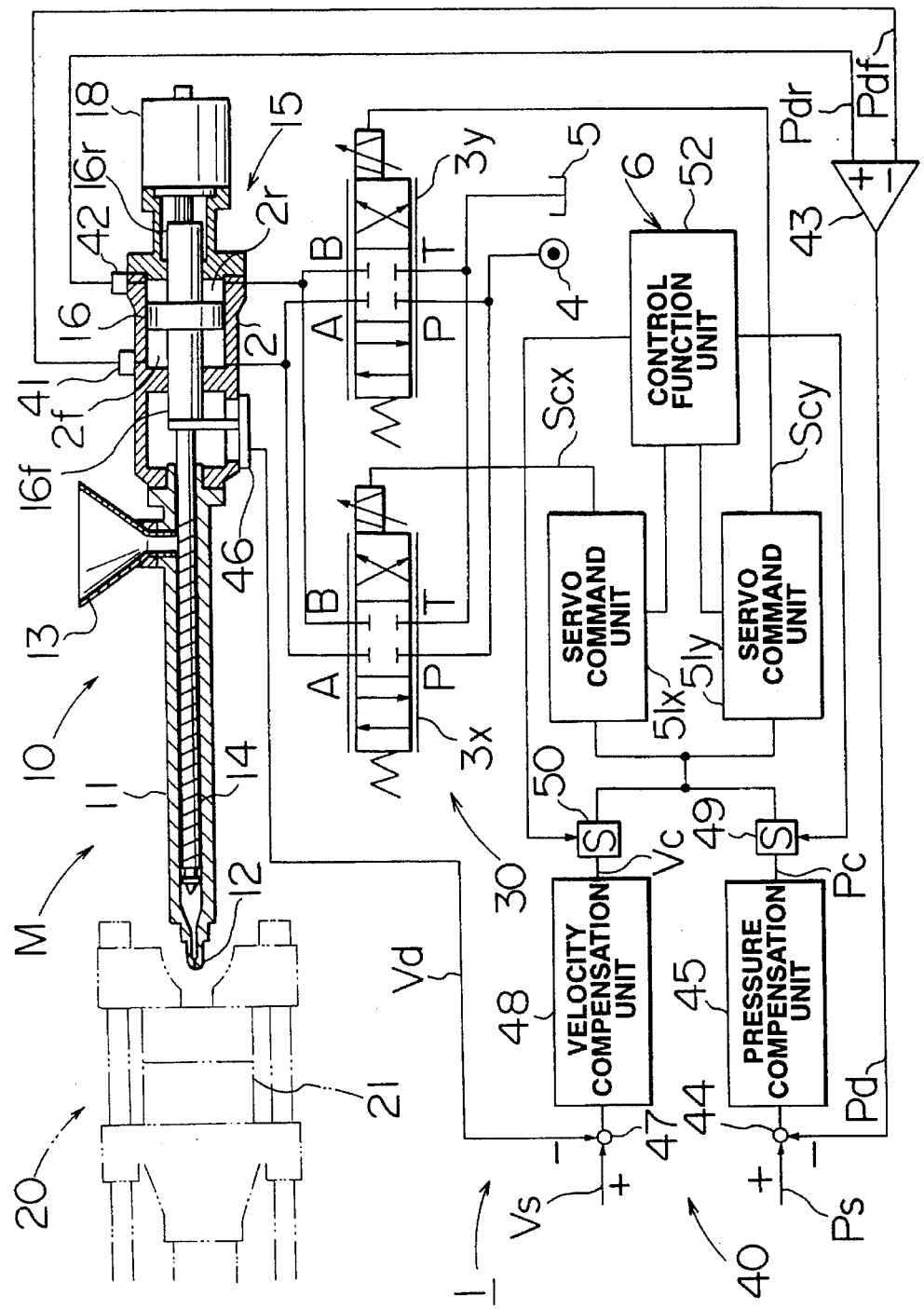
FIG. 1 is a block diagram of the hydraulic control circuit of the present invention for an injection molding machine.

In FIG. 1, symbol M represents an injection molding machine. The injection molding machine M comprises an injection apparatus 10 and a clamping apparatus 20. The injection apparatus 10 comprises a barrel cylinder 11 having an injection nozzle 12 at its front end and a hopper 13 at its rear end. A screw 14 is inserted into the barrel cylinder 11 and a screw drive unit 15 is directly connected to the rear end of the barrel cylinder 11. The screw drive unit 15 comprises an injection cylinder (hydraulic actuator) 2 containing a double-rod piston 16. A front rod 16f of the piston 16 connects with the rear end of the screw 14 and a rear rod 16r of the piston 16 connects with a shaft of an oil motor 18 set to the rear end of the injection cylinder 2 through a spline. The clamping apparatus shown by virtual lines supports a mold 21 to open or close the mold 21.

The hydraulic control circuit 1 of this embodiment is connected to the injection cylinder 2. The hydraulic control circuit 1 comprises a hydraulic circuit 30 and a control circuit 40. The hydraulic circuit 30 comprises two four-port servo valves 3x and 3y both of which have the same characteristics. The ports A, B, P, and T of the servo valve 3x and those of the servo valve 3y are connected to each other in common. The port A is connected to a front oil chamber 2f of the injection cylinder 2, the port B is connected to a rear oil chamber 2r of the injection cylinder 2, the port P is connected to an hydraulic source (hydraulic pump and accumulator) 4, and the port T is connected to an oil tank 5.

The control circuit 40 includes a pressure sensor 41 for detecting the pressure of the front oil chamber 2f of the injection cylinder 2, a pressure Pdf sensor 42 for detecting the pressure Pdr of the rear oil chamber 2r of the injection cylinder 2, a comparator 43 for obtaining the difference between pressures (Pdf, Pdr) of the pressure sensors 41 and 42, a deviation detector 44 for obtaining the deviation of the detected pressure Pd outputted by the comparator 43 from the preset pressure Ps, and a pressure compensation unit 45 for obtaining the pressure control input Pc compensating the deviation obtained from the deviation detector 44. Control circuit 40 further includes a velocity detection unit 46 for detecting the position of the screw 14 to obtain the detected velocity Vd, a deviation detector 47 for obtaining the deviation of the detected velocity Vd from the preset velocity Vs, and a velocity compensation unit 48 for obtaining the velocity control input Vc compensating the deviation obtained from the deviation detector 47.

Control circuit 40 also includes switch function units 49 and 50 for selecting the pressure control input Pc and the velocity control input Vc, and servo command units 51x and 51y for converting the pressure control input Pc or the velocity control input Vc into a command signal Scx or Scy for controlling the servo valve 3x or 3y. The command signal (Scx or Scy) outputted by the servo command units (51x or 51y) is inputted to the command signal input unit of the servo valve (3x or 3y).

Moreover, the control circuit 40 is equipped with a control function unit 52 including a servo valve control function unit 6. The control function unit 52 has a function for turning on/off the switch function units 49 and 50 and a function for controlling the servo valves 3x and 3y preferentially to the velocity control input Vc and the pressure control input Pc inputted to the servo command units 51x and 51y from the built-in servo valve control function unit 6.

The operations of the hydraulic control circuit 1 of this embodiment for an injection molding machine are described below by referring to FIGS. 1 to 3.

First, the basic operation is described below. When velocity is controlled, the switch function unit 50 is turned on and the switch function unit 49 is turned off by the control function unit 52. At the same time, the deviation of the detected velocity Vd from the preset velocity Vs is obtained from the deviation detector 47, the deviation is inputted to the velocity compensation unit 48, and the compensated velocity control input Vc is obtained from the velocity compensation unit 48. Then, the velocity control input Vc is inputted to the servo command units 51x and 51y simultaneously.

In the servo command units 51x and 51y, the velocity control input Vc is converted into the command signals Scx and Scy for controlling the servo valves 3x and 3y by assuming that priority is given to a control command (to be described later) sent from the servo valve control function unit 6. Therefore, the command signals Scx and Scy are inputted to the control signal input unit of the servo valves 3x and 3y, respectively and a flow rate is thereby controlled by the servo valves 3x and 3y. As a result, pressure oil whose flow rate is controlled is supplied to the rear oil chamber 2r of the injection cylinder 2 and the screw 14 progresses. Moreover, the actually detected velocity Vd is obtained from the velocity detection unit 46. Thereby, the command signals Scx and Scy change and feedback control is performed so that the progress velocity of the screw 14 becomes equal to the preset velocity Vs.

When pressure is controlled, the switch function unit 50 is turned off and the switch function unit 49 is turned on by the control function unit 52. Moreover, the difference between detected pressures Pdf and Pdr detected by the pressure sensors 41 and 42, that is, the detected pressure Pd is obtained from the comparator 43. The deviation of the detected pressure Pd from the preset pressure Ps is obtained from the deviation detector 44. The deviation is inputted to the pressure compensation unit 45 and the compensated pressure control input Pc is obtained from the pressure compensation unit 45. Then, the pressure control input Pc is inputted to the servo command units 51x and 51y simutaneously.

In the servo command units 51x and 51y, the pressure control input Pc is converted into the command signals Scx and Scy for controlling the servo valves 3x and 3y by assuming that priority is given to a control command (to be described later) sent from the servo valve control function unit 6. Therefore, the command signals Scx and Scy are inputted to the control signal input unit of the servo valves 3x and 3y, respectively and hydraulic pressure is controlled by the servo valves 3x and 3y. As a result, pressure oil whose pressure is controlled is supplied to the rear oil chamber 2r of the injection cylinder 2 and the screw 14 is pressured. Moreover, actually detected pressures Pdf and Pdr are detected by the pressure sensors 41 and 42 and also the detected pressure Pd is obtained from the comparator 43. Thereby, the command signals Scx and Scy change and feedback control is performed so that the pressure of the screw 14 becomes equal to the preset pressure Ps.

A control command is inputted to the servo command units 51x and 51y from the servo valve control function unit 6 and thereby the servo valves 3x and 3y are preferentially controlled without being influenced by the velocity control input Vc or the pressure control input Pc. The following is the detailed description of how the servo valve control unit 6 controls the servo valves 3x and 3y.

The flow rate Qx shouldered by the servo valve 3x is shown by the following expression by assuming the flow coefficient of the servo valve 3x is Cx, the opening area of the servo valve 3x as Ax, the valve differential pressure as $\Delta P$, and the oil viscosity as $\rho$.

$$Qx = Cx \times Ax \times \sqrt{\frac{2\Delta\rho}{\rho}}$$

The flow rate Qy shouldered by the servo valve 3y is shown by the following expression by assuming the flow coefficient of the servo valve 3y is Cy, the opening area of the servo valve 3y is Ay, the valve differential pressure is as $\Delta P$, and the oil viscosity as $\rho$.

$$Qy = Cy \times Ay \times \sqrt{\frac{2\Delta\rho}{\rho}}$$

Thereby, the total flow rate Q to be obtained is shown by the following expression.

$$Q = Qx + Qy = (Cx \times Ax + Cy \times Ay) \times \sqrt{\frac{2\Delta\rho}{\rho}}$$

Therefore, if the servo valves 3x and 3y have the same characteristics, the flow rate Q is obtained which is two times larger than the flow rate when only the servo valve 3x is used. When PID control is performed, the derivation e is shown is "e=S−F" by assuming a preset value S and a feedback value is F. Also, the servo control input SV is shown as "SV=Kp×e+(Ki/Ti)∫edx+Kd×Td(de/dt)" by assuming Kp is a proportional gain, Ki is a storage gain, Ti is an integral time, Kd is a derivative gain, and Td as a derivative time.

Therefore, it is possible to select series operation and parallel operation of the servo valves 3x and 3y in accordance with an obtained arithmetic result.

That is, in the case of the series operation, a control command is inputted to the servo valve command unit 51y from the servo valve control function unit 6 and the control for keeping the servo valve 3y fully closed (valve divergence of 0%) is performed. Thereby, the pressure control input Pc or the velocity control input Vc is converted into the command signal Scx only by the servo valve command unit 51x and feedback control is applied to the operation of the injection cylinder 2 (pressure or progress velocity of the screw 14) by the servo valve 3x as shown in FIG. 2. When the valve divergence of the servo valve 3x is maximized, a control command is inputted to the servo command unit 51x from the servo valve control function unit 6 and the control for keeping the servo valve 3x fully open (valve divergence of 100%) is performed. However, the control for keeping the servo valve 3y fully close is canceled and the pressure control input Pc or the velocity control input Vc is converted into the command signal Scy only by the servo valve command unit 51y.

Figure 2:
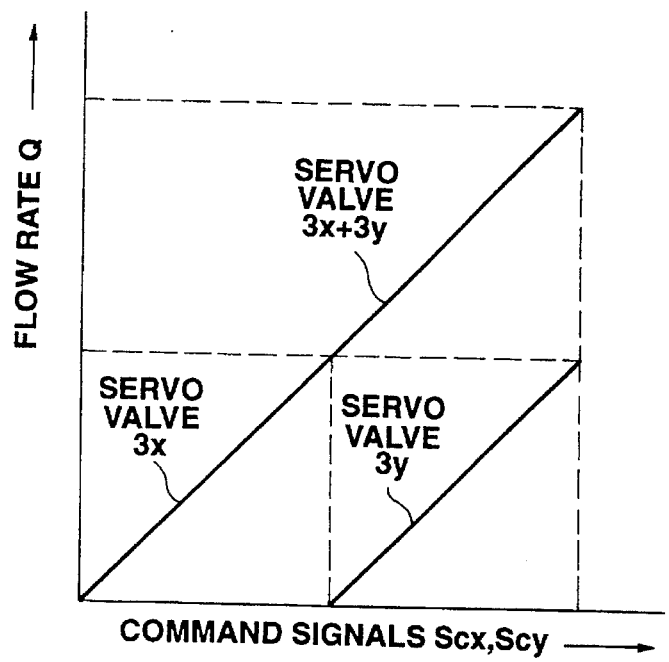
FIG. 2 is a characteristic diagram showing the relation between command signal and flow rate when operating a plurality of servo valves in series by using the hydraulic control circuit of the present invention for an injection molding machine.
Figure 3:
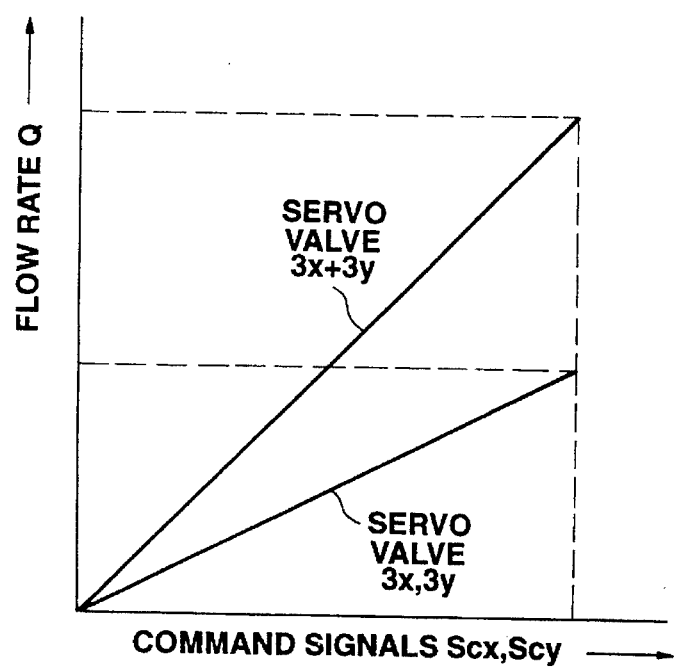
FIG. 3 is a characteristic diagram showing the relation between command signal and flow rate when operating a plurality of servo valves by using the hydraulic control circuit of the present invention for an injection molding machine.
Figure 4:
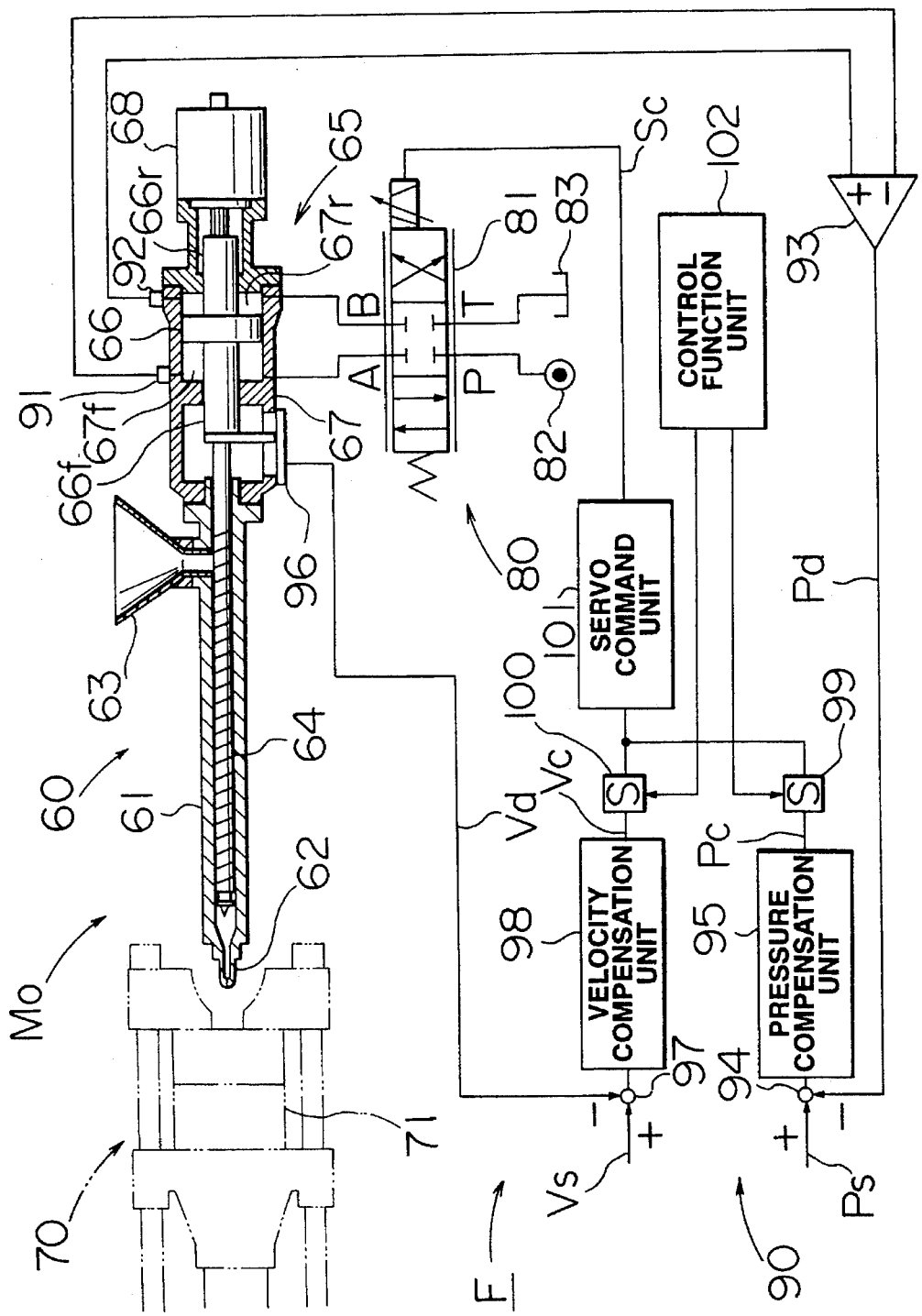
FIG. 4 is a block diagram of an hydraulic control circuit according to the prior art for an injection molding machine.

As a result, as shown in FIG. 2, the servo valve 3x secures the flow rate at the divergence of 100% and the operation of the injection cylinder 2 is feedback-controlled by the servo valve 3y. Therefore, the servo valves 3x and 3y operate in series in accordance with a combination of the above controls.

In the case of parallel operation, no control command is outputted to the servo valve command unit 51x or 51y from the servo valve control function unit 6. Therefore, as shown in FIG. 3, the operation of the injection cylinder 2 is feedback-controlled simultaneously by the servo valves 3x and 3y. Thereby, the servo valves 3x and 3y operate in parallel and thus the control flow rate of the servo valve 3x and that of the servo valve 3y come to ½ the total flow rate respectively.

Therefore, even when the specification of an injection molding machine requires larger size and higher speed, the size of a servo valve is prevented from increasing, the cost is decreased, and the response speed and the stability are remarkably improved by operating the servo valves 3x and 3y in parallel. Moreover, by operating the servo valves 3x and 3y in series, the control range expands and fine control is realized.

An embodiment of the present invention is described above in detail. However, the present invention is not restricted to the embodiment. Though the embodiment is constituted with hardware, it is also possible to execute the same processing by software. Moreover, though a plurality of servo valves with the same characteristic are used, it is also possible to use servo valves with different characteristics. Furthermore, though two servo valves are connected in parallel in the above embodiment, it is also possible to connect three servo valves or more. Furthermore, though the injection cylinder of an injection apparatus is controlled in the above embodiment, it can be used as other hydraulic cylinder such as a clamping cylinder or any hydraulic actuator. Furthermore, though a servo valve uses a four-port servo valve in the above embodiment, it is also possible to use other type of servo valve. Furthermore, it is possible to change detailed constitution, quantity, and technique as long as they do not depart from the gist of the present invention. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A hydraulic control circuit for a hydraulic system, said hydraulic control circuit having a hydraulic pressure source and an oil tank connected to a hydraulic actuator through a plurality of parallel servo valves, comprising:
   a servo valve control unit controlling each of the plurality of parallel servo valves to act individually or in concert to supply hydraulic pressure to the hydraulic actuator.

2. The hydraulic control circuit of claim 1, wherein the servo valve control function unit uses one of the plurality of parallel servo valves for feedback control of a hydraulic actuator and keeps the other servo valves either fully closed or fully opened.

3. The hydraulic control circuit of claim 1, wherein the servo valve control unit feedback controls the plurality of parallel servo valves in concert to supply hydraulic pressure to the hydraulic actuator.

4. The hydraulic control circuit of claim 1, wherein the hydraulic actuator is an injection cylinder in an injection molding machine.

5. The hydraulic control circuit of claim 1, wherein the actuator includes a double-rod piston.

6. The hydraulic control circuit of claim 1, wherein the plurality of parallel servo valves are four-port servo valves.

7. The hydraulic control circuit of claim 5, wherein the plurality of servo valves are four-port servo valves.

8. An apparatus for controlling a hydraulic actuator, comprising:
   a first servo valve supplying hydraulic pressure to the hydraulic actuator;
   a first servo command unit converting a servo command input into a first command signal and controlling said first servo valve with the first command signal;
   a second servo valve, parallel to said first servo valve supplying hydraulic pressure to the hydraulic actuator;
   a second servo command unit converting the servo command input into a second command signal and controlling said second servo valve with the second command signal; and
   a control unit selectively supplying either a first control parameter, a second control parameter, or both the first and second control parameters to said first and second servo command units as the servo command input.

9. The apparatus of claim 8, wherein the first control parameter is a velocity of an object actuated by the hydraulic actuator.

10. The apparatus of claim 8, wherein the second control parameter is a pressure value generated in the hydraulic actuator.

11. The apparatus of claim 8, wherein the hydraulic actuator drives a screw of an injection molding machine and includes a double-rod piston defining a front chamber and a rear chamber; and wherein said first and second servo valves are four-port servo valves having a first port connected to a hydraulic pressure source, a second port connected to an oil tank, a third port connected to the front chamber, and a fourth port connected to the rear chamber.

12. The apparatus of claim 11, wherein the first control parameter is a parameter related to a velocity of the screw.

13. The apparatus of claim 8, wherein the second control parameter is parameter related to a pressure in the hydraulic actuator.

14. The apparatus of claim 11, further comprising:
   a velocity compensation unit inputting a difference between a detected velocity of the screw and a preset velocity value and outputting a velocity control amount as the first control parameter.

15. The apparatus of claim 11, further comprising:
   a comparator comparing detected pressures in the front and rear chambers, and
   a pressure compensation unit inputting a difference between the comparator output and a preset pressure value and outputting a pressure control amount as the second control parameter.

16. The apparatus of claim 11, further comprising:
   a velocity comparator comparing a detected velocity of the screw and a preset velocity value,
   a velocity compensation unit inputting the velocity comparator output and outputting a velocity control amount as the first control parameter,
   a pressure comparator comparing a detected front chamber pressure and a detected rear chamber pressure, and
   a pressure compensation unit inputting a difference between the pressure comparator output and a preset pressure value and outputting a pressure control amount as the second control parameter.

17. The apparatus of claim 16, further comprising:
   a first switch interposed between said velocity compensation unit and said first and second servo command units,
   a second switch interposed between said pressure compensation unit and said first and second servo command units,
   wherein said control unit supplies the first control parameter to said first and second servo command units as the servo command input by actuating said first switch,
   wherein said control unit supplies the second control parameter to said first and second servo command units as the servo command input by actuating said second switch, and wherein said control unit supplies both the first and the second control parameters to said first and second servo command units as the servo command input by actuating both said first switch and said second switch.

18. A control circuit for a hydraulic system, said control circuit having a plurality of parallel servo valves operatively connected to a hydraulic pressure source, an oil tank, and a hydraulic actuator, comprising:

a plurality of control parameter compensating units, responsive to respective control parameters of the hydraulic system, outputting a respective command signal;

a plurality of servo command units outputting respective servo commands to the plurality of parallel servo valves in response to the servo valve command input, and a control unit selectively supplying either a single command signal or a plurality of command signals as the servo valve command input to said plurality of servo command units.

19. The control circuit of claim 18, further comprising:

a plurality of comparators comparing respective parameters of the hydraulic system with respective predetermined values to output respective control parameters of the hydraulic system to said plurality of control parameter compensating units.

20. The control circuit of claim 18 wherein the hydraulic actuator drives a screw of an injection molding machine and includes a double-rod piston defining a front chamber and a rear chamber; and wherein said plurality of parallel servo valves are four-port servo valves having a first port connected to a hydraulic pressure source, a second port connected to an oil tank, a third port connected to the front chamber, and a fourth port connected to the rear chamber.

21. The control circuit of claim 20, wherein one of the control parameters is a parameter related to the velocity of the screw.

22. The control circuit of claim 20, wherein one of the control parameters is parameter related to a pressure in the hydraulic actuator.

* * * * *